Sept. 22, 1970  P. EMBREE  3,530,430
METHOD OF AND APPARATUS FOR STACKING ELECTRICAL SEISMIC TRACES
Original Filed March 21, 1966

PETER EMBREE
INVENTOR

ATTORNEY

United States Patent Office 3,530,430
Patented Sept. 22, 1970

3,530,430
METHOD OF AND APPARATUS FOR STACKING ELECTRICAL SEISMIC TRACES
Peter Embree, Farmers Branch, Tex., assignor to Texas Instruments Incorporated, Dallas, Tex., a corporation of Delaware
Continuation of application Ser. No. 535,758, Mar. 21, 1966. This application Mar. 4, 1968, Ser. No. 710,400
Int. Cl. G01v 1/28
U.S. Cl. 340—15.5                    3 Claims

ABSTRACT OF THE DISCLOSURE

Method of and apparatus for stacking electrical seismic traces of two seismic records representing seismic waves detected at the same receiving locations in response to the generation, spaced in time, of seismic waves at two different elevations at the same sending location by passing one of the electrical seismic traces of one seismic record through a time domain filter and passing the corresponding electrical seismic traces of the other seismic record through a time domain filter and controlling the filter parameters in accordance with the cross and auto correlation functions of the electrical seismic traces.

---

This application is a continuation of application Ser. No. 535,758, now abandoned.

This invention relates to the removal of ghosts and reverberations from seismic data, and more particularly to the utilization of two seismic sources at different elevations with two-channel filtering based on auto and cross correlation of and between the two resulting seismic records.

In seismic exploration, seismic waves are generally generated by detonating an explosive charge at a selected depth in a relatively shallow borehole on land operations or at a suitable depth below the water surface in marine operations. Other modes of generation are also employed. The resultant seismic waves travel in all directions from the source. Waves which travel downwardly through the earth are in part reflected and transmitted by the successive interfaces between subsurface earth strata.

Reflected pulses of such energy, detected at the earth's surface at a plurality of seismic detector stations spaced from the location of the shot, are separately recorded on multi-trace seismograms in variable amplitude side-by-side traces or on magnetic tape as variable amplitude analog representations of the received signals or in digital form. The coincidence in time between the similar wavelets on all or most of the traces on such a recording has long been recognized by seismic observers as indicative of reflection from the same subsurface horizon. From such time-amplitude measurements, the depths of the subsurface reflecting horizons are determined. By moving the location of the source and the detecting spread along a given traverse, the variations of the depth of the subsurface horizons underlying the traverse can be plotted to produce subsurface contour maps.

In carrying out such operations, seismic interpreters are troubled by waves recorded on a seismogram of unwanted noise energy which obscures signal energy. It has heretofore been recognized that one source of noise which renders a seismogram difficult to interpret arises by reason of the presence of ghosts and reverberation energy. More particularly, in marine operations, the seismic energy tends to reverberate in the zone bounded by the water-air interface at the top and the water-earth interface at the bottom of the marine area. Such reverberation is also encountered in some instances in the near-surface layers in land operations. Representative of the prior art dealing with certain aspects of improving seismic data is U.S. Pat. No. 3,136,974 to Sirks, which represents an attempt to eliminate reverberations and ghosts. In addition, U.S. Pat. No. 2,882,988 to Dobrin represents one method of eliminating the ghost or surface multiple.

Such prior art methods for removing ghosts have been dependent upon two-channel filters based exclusively on an assumption as to the nature of the physical model in which the basic shot wavelet spectrum and the ghost complex are identical for two shots except for a difference in the primary-ghost differential arrival times. Prior deghosting techniques, then essentially consisted of inverting one shot in polarity relative to the other, time shifting to align the now opposite polarity ghosts, summing and filtering appropriately to correct the resulting distortion to primary reflections. Where the actual data fits the assumed model, the techniques may be adequate, but when primaries or ghosts have different amplitudes or frequency spectra or incorrectly measured time shifts between the two shots, and therefore do not fit the assumed model, results frequently are unsatisfactory.

In contrast with prior are methods, the present invention has been found to have distinct advantages in that it (a) removes the ghosts using a two-channel system based on the data's actual correlation statistics, which include actual relative amplitude, time shift and frequency content, rather than an assumed physical model; (b) effects deconvolution; and (c) utilizes primary-ghost correlation which is ignored in the prior methods.

More particularly, in accordance with the present invention, seismic records are obtained by generating seismic waves successively at two different depths at the same source location and detecting the resultant waves in the same detecting spread. The records are then stacked on a trace-by-trace basic by employing a first delay means simultaneously to produce a plurality of output signals from a first trace on a first of the records. A second delay means simultaneously provides a plurality of outputs representative of the value of a corresponding trace on the second of the records. Attenuators individual to the several outputs from each trace multiply each trace by a predetermined individual constant to provide output product signals. The latter signals are then summed and registered as a function of the time scale on the two seismic records. The invention involves the use of the attenuators set to determine the multiplier constants in accordance with the relationships between the received waves represented by the two traces to be stacked. The relationships are of the type which may be represented by a matrix equation based upon the auto correlation functions of the two traces and the cross correlation functions of the two traces. By this means, the filters employed before summation are uniquely related to the two traces being stacked.

For a more complete understanding of the present invention and for further objects and advantages thereof, reference may now be had to the following description taken in conjunction with the accompanying drawings in which.

Figure 1:
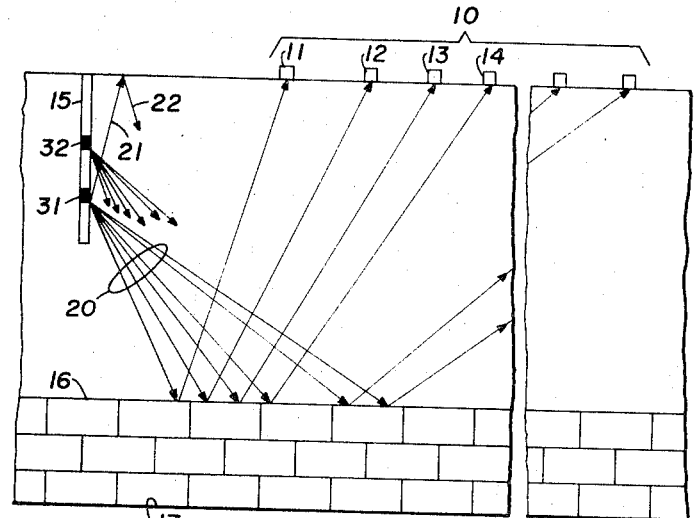
FIG. 1 illustrates a seismic exploration source and detecting system.

Referring now to FIG. 1, a seismic exploring system has been shown in which seismometers 11–14 and others are included in a spread 10 located along the earth's surface. They are located along a radial line which intersects the axis of a shot hole 15. The shot hole is relatively shallow as compared with the depth of subsurface reflecting interfaces 16 and 17.

It has been found that highly improved seismograms can be produced by stacking the data present on two or more individual seismograms where such individual seismograms are produced with a variation between them in the shot depth or in the distance from the shot hole 15 to the spread 10. One area of seismic exploration may be referred to as "uphole stacking." In this operation, the spread 10 is maintained at a fixed location relative to the shot hole 15 while separate shots are successively detonated at different depths in the borehole 15 to produce two separate and distinct seismograms. The seismograms are uniquely interrelated in that the reflection energy on each of the seismograms is dependent upon the depth and attitude of the same subsurface interfaces. By combining the two records, trace by trace, or as is commonly known in the art, by stacking the two seismograms to produce a single resultant seismogram, steps are taken in accordance with this invention to assure that the reflection energy on one of the seismograms will be added to the reflection energy on the other seismogram in reinforcing relation, whereas the unwanted noise energy can be substantially eliminated by cancellation.

In FIG. 1, the ray paths 20 represent the direct downgoing energy or the primary energy. However, since the seismic energy travels in all directions from the shot, at least one important ray path is the path 21 and the surface reflection path 22. Energy traveling this path is generally known as the surface multiple. When the energy traveling past paths 21 and 22 is ultimately received in the detecting spread 10, the primary reflection is combined with the ghost of surface multiple to obscure and render difficult the interpretation of the seismogram. It is such unwanted noise that is to be eliminated by the use of an uphole stack. The present invention is directed to carrying out the uphole stacking process in such a manner as to optimize the signal enhancement and noise elimination.

In accordance with the present invention, two shots 31 and 32 are produced in shot point 15 from two different depths, shot 31 being deeper than the shallow shot 32. Two separate seismograms are produced, each having a plurality of traces corresponding in number with the geophones in the spread 10.

Consider two such seismic traces $x_1(t)$ and $x_2(t)$ produced from two shots 31 and 32 at different (deeper and shallower, respectively) depths in a shot hole. A subsurface impulse response will be referred to as $s(t)$, shot wavelets or filtering functions due to shot coupling and near-surface geological conditions for initially down-going primary energy will be referred to as $h_1(\tau)$ and $h_2(\tau)$ for shots 31 and 32, respectively, and ghost wavelets or filtering functions, including reflection coefficients for ghosts, the energy going initially up from the shot, then reflected down from interfaces above the shot will be noted as $g_1(\tau)$ and $g_2(\tau)$.

In the absence of filtering effects $h$ and $g$, the primary energy from the deeper and shallower shots 31 and 32 would be $s(t)$ and $s(t-2\Delta\tau_{12})$, respectively, and the ghost energy reflected from a surface above would be $s(t-2\tau_1)$ and $s(t-2\Delta\tau_{12}-2\tau_2)$ where $2\tau_1$ and $2\Delta\tau_{12}$ are respectively the times for the upgoing impulse to leave the respective shot locations, reflect from the surface, and return to the respective shot locations as down-going energy.

Then without filtering effects $h$ and $g$, $$x_1(t)=s(t)+s(t-2\tau_1) \qquad (1)$$

$$x_2(t)=s(t-2\Delta\tau_{12})+s(t-2\Delta\tau_{12}-\tau_2) \qquad (2)$$

where:

$$\Delta\tau_{12}=\tau_1-\tau_2$$

This may be expressed in the form:

$$x_1(t)= \begin{array}{c} P \quad\ G \\ \uparrow \quad \uparrow \\ \hline 0 \quad \tau_1 \end{array} \quad t \longrightarrow \qquad (3)$$

$$x_2(t)= \begin{array}{c} P \quad\ G \\ \uparrow \!\leftarrow\!\tau_2\!\rightarrow\!\uparrow \\ \hline 2\tau_{12} \quad \tau_2+2\tau_{12} \end{array} \qquad (4)$$

If the filtering effects $h$ and $g$ are included, Equations 1 and 2 become:

$$x_1(t)=s(t)*h_1(\tau)+s(t-2\tau_1)*g_1(\tau) \qquad (5)$$

$$x_2(t)=s(t-2\Delta\tau_{12})*h_2(\tau)+s(t-2\Delta\tau_{12}-2\tau_2)*g_2(\tau) \qquad (6)$$

This may be represented as:

$$x_1(t)=s(t)*y_1(\tau) \qquad (7)$$

$$x_2(t)=s(t-2\Delta\tau_{12})*y_2(\tau) \qquad (8)$$

where:

$$y_1(\tau)=h_1(\tau)+\delta(\tau-\tau_1)*g_1(\tau)$$

$$y_2(\tau)=h_2(\tau)+\delta(\tau-\tau_2)*g_2(\tau)$$

and $$y_1(\tau)=0 \text{ when } \tau<0,$$

$$y_2(\tau)=0 \text{ when } \tau<0.$$

Hence the recorded trace $f_1(t)$ at any time $t$ consists of initial energy representing $s(t)$ plus some combination of $s(t-\tau)$ for previous times $(\tau)$ earlier.

Seismic interpreters are interested almost exclusively only in that part of a trace that is not dependent on previous time, or in other words, is not predictable on the basis of previous events. By this invention, there is removed from the output estimate of signal $e(t)$ in a least mean square error sense, any dependence on the past of $x_1(t)$ or $x_2(t)$ by using the correlation of and between $x_1(t)$ and $x_2(t)$ to predict $x_1(t)$ from the past (relative to time $t$) of both $x_1(t)$ and $x_2(t)$ and subtracting that prediction from $f_1(t)$ which could be expressed as:

$$e_1(t)=x_1(t)*[\delta(\tau)-f_1(\tau)]-x_2(t)*f_2(\tau) \qquad (9)$$

where:

$$f_1(\tau)=0 \text{ when } \tau\leq 0$$

and $$f_2(\tau)=0 \text{ when } \tau\leq 0$$

Here $e(t)$ represents that part of $x_1(t)$ that is not predictable on the basis of the past or $x_1$ or $x_2$, hence could be called a "two-channel prediction error." Minimizing the prediction error corresponds to removing from $x_1(t)$ as much of it as is a function of (correlation with) the past.

The filters $f_1(t)$ and $f_2(t)$ are found as follows. The two channels $x_1(t)$ and $x_2(t)$ are first employed based on the assumption that the desired output $e(t)$ is that part of $x_1(t)$ that is not predictable (the prediction error) on the basis of the past of either $x_1(t)$ or $x_2(t)$. The function $\hat{x}_1(t)$ is an estimate or prediction of $x_1(t)$ based on the past of $x_1(t)$ and $x_2(t)$, and $x_1(t)$ and $x_2(t)$ are sampled at discrete equally spaced time points, represented as $x_{1t}$ and $x_{2t}$, where $t$ is a time index.

Then, using N points in the past of $x_{1t}$ and $x_{2t}$ as the prediction basis, $$\hat{x}_{1t}=x_{1(t-1)}f_{11}+x_{2(t-1)}f_{21}+x_{1(t-2)}f_{12}+x_{2(t-2)}f_{22}\ldots$$
$$x_{1(t-n)}f_{1n}+x_{2(t-n)}f_{2n} \qquad (10)$$

or stated otherwise, $$\hat{x}_{1t}=\sum_{1}^{N} x_{1,t-n}f_{1,n}+x_{2,t-n}f_{2,n} \qquad (11)$$

In this case, the prediction error trace is:

$$e_t = x_{1t} - \hat{x}_{1t} = \sum_{1}^{N} x_{1t} - x_{1,t-n} f_{1,n} - x_{2,t-n} f_{2,n} \quad (12)$$

If $e(t)$ is minimized on a mean square basis, then $$\overline{e_t \hat{x}_{1,\,t-n}} = 0 \text{ for } n > 0 \quad (13)$$

and $$\overline{e_t \hat{x}_{2,\,t-n}} = 0 \text{ for } n > 0 \quad (14)$$

where:

$\overline{(\Box)}$ indicates a time average.

This will be true since any non-zero time averaged product between the output and either of the input's past values would indicate that there remained some predictability between $e_t$ and either $x_{1t}$ or $x_{2t}$.

If the quantities, $$\overline{x_{1,t} x_{1,t-m}} = \emptyset_{11}(m) \quad (15)$$

$$\overline{x_{1,t} x_{2,t-m}} = \emptyset_{12}(m) \quad (16)$$

$$\overline{x_{2,t} x_{2,t-m}} = \emptyset_{22}(m) \quad (17)$$

$$\overline{x_{2,t} x_{1,t-m}} = \emptyset_{21}(m) \quad (18)$$

the following relationships are true:

$$\overline{e_t x_{1,t-m}} = \sum_{1}^{N} \overline{x_{1,t} x_{1(t-m)}} - \overline{x_{1,t-n} x_{1,t-m}} f_{1,n} - \overline{x_{2,t-n} x_{1,t-m}} f_{2,n} = 0 \quad (19)$$

$$\overline{e_t x_{1,t-m}} = \sum_{1}^{N} \emptyset_{11}(m) - \emptyset_{11}(n-m) f_{1,n} - \emptyset_{21}(n-m) f_{2,n} = 0 \quad (20)$$

$$\overline{e_t x_{2,t-m}} = \sum_{1}^{N} \emptyset_{12}(m) - \emptyset_{12}(n-m) f_{1,n} - \emptyset_{22}(n-m) f_{2,n} = 0 \quad (21)$$

It will be seen that since there should be no correlation between the error trace $e_t$ and the prediction $\hat{x}_1(t)$, i.e., $$\overline{e_t x_{1t}} = 0,$$

the following relationship will be true:

$$P_{11} = \overline{e_t^2} = \overline{e_t(x_{1t} - \hat{x}_{1t})} = \overline{e_t x_{1t}}$$

$$= \sum_{1}^{N} \emptyset_{11}(0) - \emptyset_{11}(n) f_{1n} - \emptyset_{21}(n) f_{2n} = \overline{e_t^2} \quad (22)$$

and $$P_{12} = \overline{e_t x_{2t}} = \sum_{1}^{N} \emptyset_{12}(0) - \emptyset_{12}(n) f_{1n} - \emptyset_{22}(n) f_{2n} = P_{12} \quad (23)$$

From Equation 22 it will be understood that $P_{11}$ is an auto correlation coefficient in terms of the power in the output or error trace $e_t$ (after filtration and summation). More particularly, it is the cross correlation between the error signal $e_t$ and $x_{1t}$. The quantity $P_{11}$ is a scalar quantity produced in accordance with the relations set out in Equation 22. $P_{12}$ is a cross correlation factor, i.e., the cross power between the error signal $e_t$ and the second trace $x_{2t}$ and is likewise a scalar quantity.

Equations 22 and 23 can then be expressed in matrix form:

$$\begin{bmatrix} \begin{bmatrix} \emptyset_{11}(0) \emptyset_{21}(0) \\ \emptyset_{12}(0) \emptyset_{22}(0) \end{bmatrix} & \begin{bmatrix} \emptyset_{11}(1) \emptyset_{21}(1) \\ \emptyset_{12}(1) \emptyset_{22}(1) \end{bmatrix} & \cdots & \begin{bmatrix} \emptyset_{11}(n) \emptyset_{21}(n) \\ \emptyset_{12}(n) \emptyset_{22}(n) \end{bmatrix} \\ \begin{bmatrix} \emptyset_{11}(1) \emptyset_{12}(1) \\ \emptyset_{21}(1) \emptyset_{22}(1) \end{bmatrix} & \begin{bmatrix} \emptyset_{11}(0) \emptyset_{21}(0) \\ \emptyset_{12}(0) \emptyset_{22}(0) \end{bmatrix} & \cdots & \begin{bmatrix} \emptyset_{11}(n-1) \emptyset_{21}(n-1) \\ \emptyset_{12}(n-1) \emptyset_{22}(n-1) \end{bmatrix} \\ \vdots & & & \vdots \\ \begin{bmatrix} \emptyset_{11}(n) \emptyset_{12}(n) \\ \emptyset_{21}(n) \emptyset_{22}(n) \end{bmatrix} & \begin{bmatrix} \emptyset_{11}(n-1) \emptyset_{12}(n-1) \\ \emptyset_{21}(n-1) \emptyset_{22}(n-1) \end{bmatrix} & \cdots & \begin{bmatrix} \emptyset_{11}(0) \emptyset_{21}(0) \\ \emptyset_{12}(0) \emptyset_{22}(0) \end{bmatrix} \end{bmatrix} \begin{bmatrix} \begin{bmatrix} -1 \\ 0 \end{bmatrix} \\ \begin{bmatrix} f_{11} \\ f_{12} \end{bmatrix} \\ \vdots \\ \begin{bmatrix} f_{1n} \\ f_{2n} \end{bmatrix} \end{bmatrix} = \begin{bmatrix} \begin{bmatrix} -P_{11} \\ -P_{12} \end{bmatrix} \\ \begin{bmatrix} 0 \\ 0 \end{bmatrix} \\ \vdots \\ \begin{bmatrix} 0 \\ 0 \end{bmatrix} \end{bmatrix} \quad (24)$$

where:

$\emptyset_{11}(n)$ is the value of the auto correlation function of trace $x$ for $\tau = n$;

$\emptyset_{22}(n)$ is a similar value based on trace $x_2$;

$\emptyset_{12}(n)$ and $\emptyset_{21}(n)$ are the values of the respective cross correlation functions of traces $x_1$ and $x_2$ for $\tau = n$;

$-1, 0, f_{11}, f_{21} \ldots f_{1n}, f_{2n}$ correspond respectively to the weights applied to the successive members of the two sets of seismic traces; and $P_{11}$ and $P_{12}$ are uniquely identified by the solution of the equation.

Since the number of unknowns in Equation 24 does not exceed the number of equations, a solution is possible. The solution may be determined for the unknowns by a brute force method. Preferably, however, the equations can be evaluated to produce physical representations of the unknowns. More simply, by a known procedure, such as outlined by Ralph Wiggins in an article entitled "Recursive Solution to the Multi-Channel Filtering Problem," in Journal of Geophyshical Research, vol. 70, No. 8, to yield the multi-channel prediction error filters $f_{1n}$ and $f_{2n}$, plus the output power $e^2_{1t}$ and the correlation coefficient $P_{12}$ between $e_1(t)$ and $x_2(t)$.

Based on the foregoing, this invention involves:

(A) Using sampled data and digital computer:

(1) Sample $x_1(t)$ and $x_2(t)$ obtaining $x_{1t}$ and $x_{2t}$, respectively.

(2) Generate physical functions representative of the correlation coefficients $\emptyset_{11}(n)$, $\emptyset_{22}(n)$, $\emptyset_{12}(n)$, and $\emptyset_{21}(n)$.

(3) Generate physical functions representative of the matrix equations above to obtain the $f_{1n}$ and $f_{2n}$ values.

(4) Generate a function representative of $$e_{1t} = x_{1t} - [\Sigma(x_{1,t-n} * f_{1n} + x_{2,t-n} * f_{2n})]; \text{ or} \quad (25)$$

(B) Using analog techniques:

(1) Use multipliers, delay lines, and integrators to measure estimates of $\emptyset_{11}(n)$, $\emptyset_{22}(n)$, $\emptyset_{12}(n)$, and $\emptyset_{21}(n)$.

(2) Generate functions representative of the solution to the matrix equations for delay line filters $f_1(\tau)$ and $f_2(\tau)$.

Figure 2:
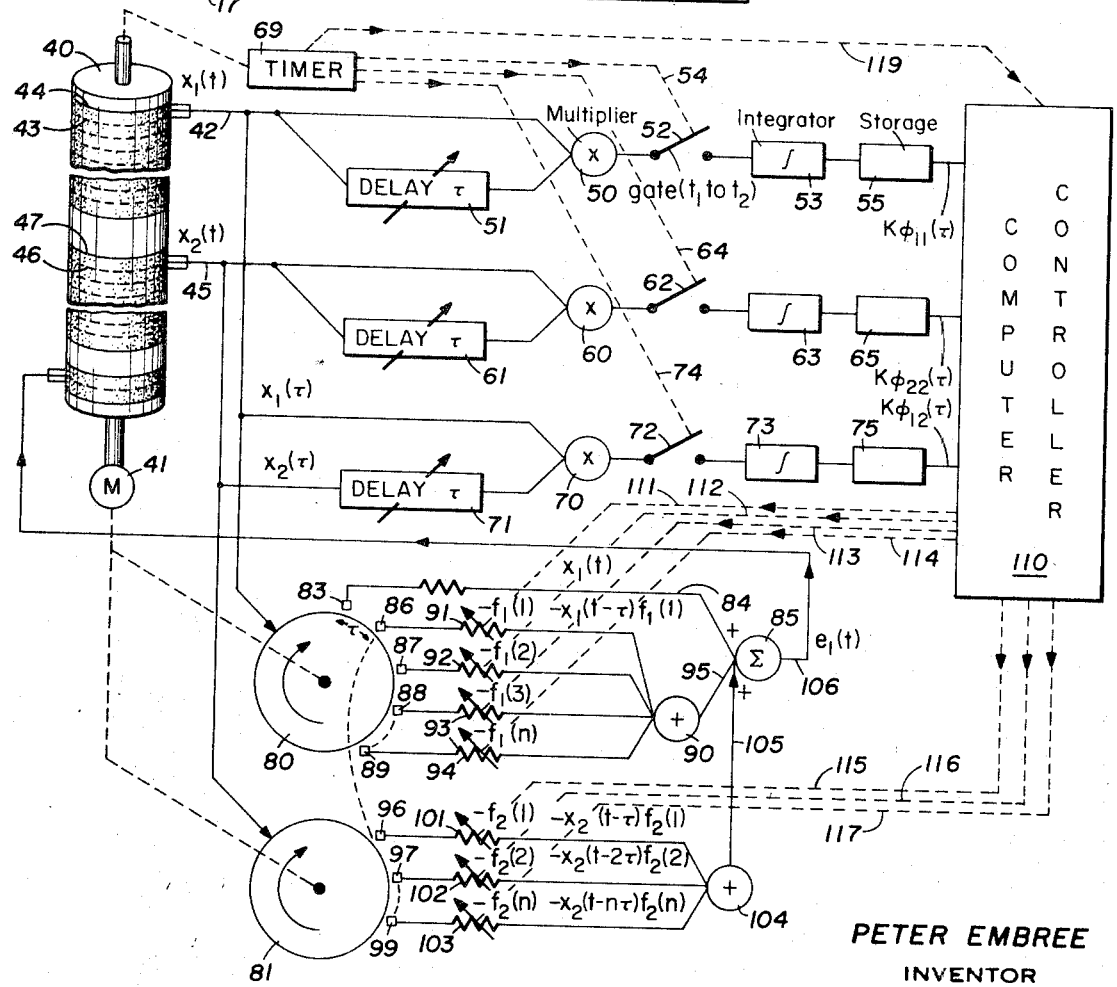
FIG. 2 illustrates an analog processing system in accordance with the present invention.

(3) Apply the delay line filters $f_1(\tau)$ and $f_2(\tau)$ as shown in FIG. 2.

Inasmuch as any ghosts, reverberation or shot wavelets remaining in the data would constitute a dependence on past events in $x_1$ or $x_2$, and this dependence is removed on a least mean square error basis by the process described, and inasmuch as any relative scaling of ghosts and/or primaries between the two shots $x_1(t)$ and $x_2(t)$ is implicit in the correlation functions hence reflected in the matrix equations for $f_{1t}$ and $f_{2t}$, then it is clear that any such ghost reverberations and shot wavelets are effectively removed by the present invention without requiring a prior knowledge or assumption about their existence or relative scaling between shots.

In the analog system shown in FIG. 2, a drum 40 is driven by a motor 41 at a uniform speed so that trace $x_1(t)$ cyclically will be produced. By way of example, the resultant signal on output channel 42 may be representative of the seismic waves detected by seismometer 11, FIG. 1, and recorded on trace 43 of the upper record 44 dependent upon waves produced by detonation of an explosive charge 31. Simultaneously, a signal $x_2(t)$ appears on channel 45. This signal is representative of the waveforms similarly detected by seismometer 11 and recorded on channel 47 of the record 46 in response to waves produced by detonation of an explosive charge 32.

The channel 42 is connected to a multiplier 50 and to an adjustable delay unit 51 whose output also is connected to multiplier 50. The output of multiplier 50 is connected by way of a switch 52 to an integrator 53. Switch 52 is coupled by way of a linkage 54 to the drive on drum 40 to close the switch 52 for a time gate $t_1$ to $t_2$ as may be selected for producing the auto correlation function of the signal $x_1(t)$. The output of the integrator 53 is connected to a suitable registering unit 55. By adjusting the delay line 51 between successive cycles of the drum 40, the complete auto correlation function may be produced and made available at the output of the registering unit 55.

Similarly, the output channel 45 is connected to a multiplier 60 and to a delay unit 61. The output of multiplier 60 is connected by way of a switch 62 to an integrator 63, whose output is connected to a registering device 65. The switch 62 is coupled by way of linkage 64 to the drive for the drum 40. Thus, in the register 65, the auto correlation function for the signal $x_2(t)$ is available with limits as set by timer 69.

Channel 42 is also coupled to a third multiplier 70. The channel 45 is connected to the input of a third delay unit 71. The multiplier 70 is coupled by way of switch 72 to an integrator 73. The output of the integrator is connected to a register or storage element 75. Switch 72 is coupled by way of linkage 74 to the drive for the drum 40. Thus, the cross correlation function between the two traces $x_1(t)$ and $x_2(t)$ is available at the unit 75. The cross correlation functions and the auto correlation functions thus produced are available for determination of the weights to be given to the filter elements.

Further to illustrate the use of the cross correlation and auto correlation functions, it will be assumed that the signal $x_1(t)$ is stored on drum 80 and signal $x_2(t)$ is stored on magnetic drum 81. A first pick-up head 83 senses the signals $x_1(t)$ and applies the latter signals by way of channel 84 to a summation unit 85. Similarly, heads 86, 87, 88 . . . 89 pick up successive time delayed representations of the signal $x_1(t)$. The latter signals are then applied to a summation unit 90 by way of attenuators 91-94, respectively. The output of the summation unit 90 is applied by way of channel 95 to the summation unit 85.

Similarly, the signal $x_2(t)$ is recorded on drum 91 and is sensed by detecting heads 96, 97 . . . 99. The latter signals are then applied by way of attenuators 101, 102, and 103 to a summation unit 104. The output of summation unit 104 is applied by way of channel 105 to the summation unit 85. A computer-controller 110, coupled at its input to units 55, 65, and 75, is operatively connected by linkages 111, 112, 113 . . . 114 to the attenuators 91-94, which operate on the trace $x_1(t)$. The computer also is operatively connected by linkages 115-117 to attenuators 101-103 which operate on trace $x_2(t)$. The output from summation unit 85 is then stored on drum 40 by way of channel 106. Thus, there is produced on the output channel 106 leading from the summation unit, the signal $$e_{1t} = x_{1t} - [\Sigma(x_{1,t-n} * f_{1n} + x_{2,st-n} * f_{2n})]$$

The computer-controller 110, whether of analog or digital form, is described in its essential character by Equation 24. The computer-controller is of the type generally well known in the art as a sampled data system and periodic controller. More particularly, it may be of the type shown in Handbook of Automation, Computation, and Control, volume 1, by Grabbe et al., John Wiley & Sons, 1958, at chapter 26, wherein both analog, digital and combined systems are described. The process controller, in terms of the systems illustrated on page 26-05 may control the filtering where the "process" of such system is involved in the operation of the drums 80 and 81 with one control actuator for each of the channels involved in the present filtering process. The "periodic switch" will be actuated by the linkage 119 of FIG. 2 thereby to adjust the attenuators at the end of each cycle of evaluation of the auto and cross correlation functions. The attenuators will be adjusted, for example, as generally indicated at page 26-05 of the above Handbook, wherein a motor is driven in a balanceable circuit for each attenuator in FIG. 2 in dependence upon an error signal representing one element $f$ in the solution of Equation 24 for adjustment of a given attenuator.

It will be recognized, however, that the analog elements of FIG. 2 may be entirely eliminated except as is necessary to provide input traces to a computer. The computer itself may be programmed successively to produce and store physical representations of the necessary cross and auto correlation functions, physical representations of the solution to Equation 24, and physical representations of the stacked trace resulting from filtering and summing in accordance with Equation 25.

In FIG. 2, the dotted intervals between playback heads 88 and 89 and between heads 97 and 99 indicate that ordinarily many more elements will be employed in the time domain filter than are represented by the five channels on drum 81 and the three channels on drum 91. In practice, the number of elements employed for each trace, i.e., the number represented by the pick-up heads 86-89, has been of the order of 18 to 24. The number that will be employed is necessarily related to the capacity of the processing equipment available and must be balanced against the economics involved. The tape transports shown in FIG. 2 may be of the type represented by the Techno Recorder-Reproducer TI-401c, manufactured by the Techno Instruments Corporation, and equipped to provide a plurality of time delayed representations of each of the traces $x_1(t)$ and $x_2(t)$.

Auto and cross correlation function generator systems have been shown only schematically in FIG. 2. Such generators are in general well known. One such unit is described in U.S. Pat. No. 2,794,965, issued June 4, 1957, to W. J. Yost. Referring now to said patent which is incorporated herein by reference, there is disclosed, in FIG. 4, an apparatus for obtaining the auto correlation function and a description thereof in column 6, lines 15-66. The seismic trace is recorded on the reproducible record 100 and the auto correlation function coefficients are produced on the chart 113. The spacing between the detectors 102, 103, etc. defines the sampling interval $\tau$, as disclosed by Yost.

It is to be understood that each record to be stacked may be in the form of a magnetic tape on which are stored 24 or more traces of raw seismic data obtained from a linear equi-spaced seismometer array of the type shown in FIG. 1. It may be a variable area photographic recording or other recording of phonographically reproducible form as well known in the seismic art. The traces may be processed, in accordance with the invention, as electrical signals obtained directly from data stored on magnetic tape in analog form or obtained from a suitable storage device in digital form. Two multi-trace records related by reason of detection in a common spread of seismic waves successively produced at different depths at the same shot location may thus be stacked on a trace-by-trace basis.

The invention has been described primarily as applied to processing data obtained from land seismic exploration. However, the invention may also be applied to data obtained from sampling acoustic waves detected in marine seismic exploration wherein underwater acoustic energy from submerged shots is successively received by a hydrophone array. It will be apparent that the data stacked in accordance with the invention may be derived from a two-dimensional seismic array. It will further be apparent that while the description has been directed primarily to stacking two seismic traces, more than two seismic traces obtained for the same array and shot location may be stacked either by sequentially processing successive pairs of records or by employing in the matrix Equation 24 three-by-three or four-by-four (or more) submatrices in place of the two-by-two submatrices discussed above.

It is to be understood that the method and apparatus above described for carrying out the invention are to be taken as illustrative only. Numerous other arrangements may be employed by those skilled in the art in order to achieve the beneficial results of the present invention. While the operation is most expeditiously accommodated through the instrumentality of a digital computer, it will be recognized that it may be accommodated in analog form, as above described and illustrated.

A suitable digital computer for generating the filter weights may be the IBM 7074 Digital Computer which includes a peripheral computer, the IBM 1401, for generating the program for the IBM 7074 to satisfy Equation 24.

The input data applied to said IBM computer is digitally coded auto and cross correlation function coefficients such as may be stored by units 55, 65, and 75. The program for said IBM computer is obtained by writing the Equation 24 in Fortran language and arranging the results on IBM 866424 cards which are then fed into the IBM 1401 peripheral computer for generating the program. The digitally coded values of the top elements of the two column matrices of Equation 24 are also included in the program. In this manner, the IBM 7074 computer is used to generate the filter weights defined by Equation 24.

However, it is pointed out that other digital computers may be used to generate the filter weights, for example, the IBM 704, the IBM 1620, the General Electric 225, or the Control Data 1604 Digital Computer. The procedures for programming these computers to perform the arithmetic operations designated by Equation 24 are conventional to those skilled in the art.

The invention has heretofore been described in conjunction with analog seismic traces $x(t)$ obtained from a seismometer output or from a magnetic tape recording and deriving therefrom its auto and cross correlation functions by the modified apparatus disclosed in the Yost patent. However, this should not be construed in a limiting sense, since the analog seismic trace may be converted into digital form by an analog-to-digital converter, recorded on a magnetic tape and thereafter applied as the input to a digital computer such as the IBM 7074 for generating the auto correlation function coefficients $\phi$. In this regard, the input seismic trace is a digital signal or signals representative of seismic waves as detected or effectively detected at a seismometer location.

When the seismic traces $x_1(t)$ and $x_2(t)$ are represented digitally, the sampling interval used in the analog-to-digital converter is referred to as $\Delta t$ and the number of sample points along the trace is $n$, thereby defining the time interval of the seismic trace ($t_1$ to $t_2$) of FIG. 2 as $n\Delta t$. The sampling interval $\tau$ of the auto correlation function is usually an integral multiple of $\Delta t$.

The digitally coded auto correlation function coefficients $\phi$ at the output of the IBM 7074 computer may then be applied to the input of the computer with the appropriate program as previously described in order to generate the filter weights $f$. Additionally, after the weights $f$ have been generated, they may be incorporated into the program of the computer in order to process the input digitally coded traces $x_1(t)$ and $x_2(t)$ as functionally illustrated by the analog operation in FIG. 2.

The prediction error filtering method of this invention is applicable to other geophysical problems wherein the traces can be time shifted to produce a desired signal present along with undesired energy in $x_1(t)$ which is not preceded in time on $x_2(t)$, and where any coherent undesired energy on $x_1(t)$ is preceded in time on $x_2(t)$.

Having described the invention in connection with certain specific embodiments thereof, it is to be understood that further modifications may now suggest themselves to those skilled in the art and it is intended to cover such modifications as fall within the scope of the appended claims.

What is claimed is:

1. A method of seismic exploration comprising the steps of generating a first group of electrical seismic traces representing a seismic record detected at a group of receiving stations in response to seismic waves generated at a first elevation at a shot location, generating a second group of electrical seismic traces representing a second seismic record detected at said group of receiving stations in response to seismic waves generated at a different elevation at said shot location, applying said first group of electrical seismic traces to automatic machine means for time delaying and modifying one of said electrical seismic traces of said first group by a first time domain filter $F_1$ to produce a first set of electric output signals, applying said second group of electrical seismic traces to automatic machine means for time delaying and modifying the corresponding electrical seismic trace of said second group by a second time domain filter $F_2$ to produce a second set of electrical output signals, and applying the sum of said first and second sets of electrical output signals to automatic machine means to produce a combined electrical output trace, said filters $F_1$ and $F_2$ bearing the relationship to said electrical traces substantially in accordance with the matrix equation:

$$\begin{bmatrix} \begin{bmatrix} \phi_{11}(0)\phi_{21}(0) \\ \phi_{12}(0)\phi_{22}(0) \end{bmatrix} & \begin{bmatrix} \phi_{11}(1)\phi_{21}(1) \\ \phi_{12}(1)\phi_{22}(1) \end{bmatrix} & \cdots & \begin{bmatrix} \phi_{11}(n)\phi_{21}(n) \\ \phi_{12}(n)\phi_{22}(n) \end{bmatrix} \\ \begin{bmatrix} \phi_{11}(1)\phi_{12}(1) \\ \phi_{21}(1)\phi_{22}(1) \end{bmatrix} & \begin{bmatrix} \phi_{11}(0)\phi_{21}(0) \\ \phi_{12}(0)\phi_{22}(0) \end{bmatrix} & \cdots & \begin{bmatrix} \phi_{11}(n-1)\phi_{21}(n-1) \\ \phi_{12}(n-1)\phi_{22}(n-1) \end{bmatrix} \\ \vdots & \vdots & & \vdots \\ \begin{bmatrix} \phi_{11}(n)\phi_{12}(n) \\ \phi_{21}(n)\phi_{22}(n) \end{bmatrix} & \begin{bmatrix} \phi_{11}(n-1)\phi_{12}(n-1) \\ \phi_{21}(n-1)\phi_{22}(n-1) \end{bmatrix} & \cdots & \begin{bmatrix} \phi_{11}(0)\phi_{21}(0) \\ \phi_{12}(0)\phi_{22}(0) \end{bmatrix} \end{bmatrix} \begin{bmatrix} \begin{bmatrix} -1 \\ 0 \end{bmatrix} \\ \begin{bmatrix} f_{11} \\ f_{21} \end{bmatrix} \\ \vdots \\ \begin{bmatrix} f_{1n} \\ f_{2n} \end{bmatrix} \end{bmatrix} = \begin{bmatrix} \begin{bmatrix} -P_{11} \\ -P_{12} \end{bmatrix} \\ \begin{bmatrix} 0 \\ 0 \end{bmatrix} \\ \vdots \\ \begin{bmatrix} 0 \\ 0 \end{bmatrix} \end{bmatrix}$$

where:

$\phi_{11}(n)$ is the value of the auto correlation function for said one trace of said first group for the noted values ($n$) of $\tau$;

$\phi_{22}(n)$ is a similar value for said corresponding trace of said second group;

$\emptyset_{12}(n)$ and $\emptyset_{21}(n)$ are the values of the respective cross correlation functions of the corresponding traces of the first and second groups for the noted values $(n)$ of $\tau$;

$-1$, $0$, $f_{11}$, $f_{21}$ ... $f_{1n}$, $f_{2n}$ correspond respectively with the relative modifications applied to the successive time delayed signals from said one trace of said first group and from said corresponding trace; and $P_{11}$ and $P_{12}$ are uniquely identified by the solution of said matrix equation.

2. A method of seismic exploration comprising in a machine the steps of:

generating a seismic disturbance at a first elevation at a source location and detecting the resultant seismic waves at a group of receiving locations spaced from said source location to produce a first group of electrical seismic traces, generating a second seismic disturbance at a different elevation at said source location and detecting the resultant seismic waves at said group of receiving locations to produce a second group of electrical seismic traces, successively time shifting and modifying said first group of electrical seismic traces by a first time domain filter $F_1$ to produce a first set of electrical output signals, successively time shifting and modifying said second group of electrical seismic traces by a second time domain filter $F_2$ to produce a second set of electrical output signals, and summing said second sets of electrical output signals to produce a combined electrical output trace, said filters $F_1$ and $F_2$ bearing the relationship to said traces substantially in accordance with the matrix equation:

$$\begin{bmatrix} \begin{bmatrix} \emptyset_{11}(0)\emptyset_{21}(0) \\ \emptyset_{12}(0)\emptyset_{22}(0) \end{bmatrix} \begin{bmatrix} \emptyset_{11}(1)\emptyset_{21}(1) \\ \emptyset_{12}(1)\emptyset_{22}(1) \end{bmatrix} \cdots \begin{bmatrix} \emptyset_{11}(n)\emptyset_{21}(n) \\ \emptyset_{12}(n)\emptyset_{22}(n) \end{bmatrix} \\ \begin{bmatrix} \emptyset_{11}(1)\emptyset_{12}(1) \\ \emptyset_{21}(1)\emptyset_{22}(1) \end{bmatrix} \begin{bmatrix} \emptyset_{11}(0)\emptyset_{21}(0) \\ \emptyset_{12}(0)\emptyset_{22}(0) \end{bmatrix} \cdots \begin{bmatrix} \emptyset_{11}(n-1)\emptyset_{21}(n-1) \\ \emptyset_{12}(n-1)\emptyset_{22}(n-1) \end{bmatrix} \\ \vdots \\ \begin{bmatrix} \emptyset_{11}(n)\emptyset_{12}(n) \\ \emptyset_{21}(n)\emptyset_{22}(n) \end{bmatrix} \begin{bmatrix} \emptyset_{11}(n-1)\emptyset_{12}(n-1) \\ \emptyset_{21}(n-1)\emptyset_{22}(n-1) \end{bmatrix} \cdots \begin{bmatrix} \emptyset_{11}(0)\emptyset_{21}(0) \\ \emptyset_{12}(0)\emptyset_{22}(0) \end{bmatrix} \end{bmatrix} \begin{bmatrix} \begin{bmatrix} -1 \\ 0 \end{bmatrix} \\ \begin{bmatrix} f_{11} \\ f_{21} \end{bmatrix} \\ \vdots \\ \begin{bmatrix} f_{1n} \\ f_{2n} \end{bmatrix} \end{bmatrix} = \begin{bmatrix} \begin{bmatrix} -P_{11} \\ -P_{12} \end{bmatrix} \\ \begin{bmatrix} 0 \\ 0 \end{bmatrix} \\ \vdots \\ \begin{bmatrix} 0 \\ 0 \end{bmatrix} \end{bmatrix}$$

where:

$\emptyset_{11}(n)$ is the value of the auto correlation function for said first group of electrical seismic traces for the noted value $(n)$ of $\tau$;

$\emptyset_{22}(n)$ is a similar value for said second group of electrical seismic traces;

$\emptyset_{12}(n)$ and $\emptyset_{21}(n)$ are the values of the respective cross correlation functions of the first and second groups of electrical seismic traces for the noted values $(n)$ of $\tau$;

$-1$, $0$, $f_{11}$, $f_{21}$ ... $f_{1n}$, $f_{2n}$ correspond respectively with the relative modifications applied to the successive time delayed signals from said first group and from said second group; and $P_{11}$ and $P_{12}$ are unquely identified by the solutions of said matrix equation.

3. A method of seismic exploration comprising in the machine the steps of generating the first group of electrical seismic traces representing a seismic record detected at a group of receiving stations in response to seismic waves generated at a first elevation at a shot location, generating a second group of electrical seismic traces representing a second seismic record detected at said group of receiving stations in response to seismic waves generated at a different elevation at said shot location, time delaying and modifying one of said electrical seismic traces of said first group by the first time domain filter $F_1$ to produce a first set of electrical output signals, time delaying and modifying the corresponding electrical seismic trace of said second group by a second time domain filter $F_2$ to produce a second set of electrical output signals, summing said first and second sets of electrical output signals to produce a combined electrical output trace, and correlating said one of said electrical seismic traces of said first group with time delay $\tau$ to produce an electrical auto correlation function $\emptyset_{11}(n)$ for the number $n$ of $\tau$ auto correlating said corresponding one of said electrical seismic traces with time shifts $\tau$ to produce an electrical auto correlation function $\emptyset_{22}(n)$ for the number $n$ of $\tau$ cross correlating said one of said electrical seismic traces of said first group and said corresponding electrical trace of said second group with time delays $\tau$ to produce the electrical cross correlation functions $\emptyset_{12}(n)$, $\emptyset_{21}(n)$ for the number $n$ of $\tau$, combining said electrical correlation functions and controlling said time domain filters $F_1$ and $F_2$ according to the matrix equation:

$$\begin{bmatrix} \begin{bmatrix} \emptyset_{11}(0)\emptyset_{21}(0) \\ \emptyset_{12}(0)\emptyset_{22}(0) \end{bmatrix} \begin{bmatrix} \emptyset_{11}(1)\emptyset_{21}(1) \\ \emptyset_{12}(1)\emptyset_{22}(1) \end{bmatrix} \cdots \begin{bmatrix} \emptyset_{11}(n)\emptyset_{21}(n) \\ \emptyset_{12}(n)\emptyset_{22}(n) \end{bmatrix} \\ \begin{bmatrix} \emptyset_{11}(1)\emptyset_{12}(1) \\ \emptyset_{21}(1)\emptyset_{22}(1) \end{bmatrix} \begin{bmatrix} \emptyset_{11}(0)\emptyset_{21}(0) \\ \emptyset_{12}(0)\emptyset_{22}(0) \end{bmatrix} \cdots \begin{bmatrix} \emptyset_{11}(n-1)\emptyset_{21}(n-1) \\ \emptyset_{12}(n-1)\emptyset_{22}(n-1) \end{bmatrix} \\ \vdots \\ \begin{bmatrix} \emptyset_{11}(n)\emptyset_{12}(n) \\ \emptyset_{21}(n)\emptyset_{22}(n) \end{bmatrix} \begin{bmatrix} \emptyset_{11}(n-1)\emptyset_{12}(n-1) \\ \emptyset_{21}(n-1)\emptyset_{22}(n-1) \end{bmatrix} \cdots \begin{bmatrix} \emptyset_{11}(0)\emptyset_{21}(0) \\ \emptyset_{12}(0)\emptyset_{22}(0) \end{bmatrix} \end{bmatrix} \begin{bmatrix} \begin{bmatrix} -1 \\ 0 \end{bmatrix} \\ \begin{bmatrix} f_{11} \\ f_{21} \end{bmatrix} \\ \vdots \\ \begin{bmatrix} f_{1n} \\ f_{2n} \end{bmatrix} \end{bmatrix} = \begin{bmatrix} \begin{bmatrix} -P_{11} \\ -P_{12} \end{bmatrix} \\ \begin{bmatrix} 0 \\ 0 \end{bmatrix} \\ \vdots \\ \begin{bmatrix} 0 \\ 0 \end{bmatrix} \end{bmatrix}$$

where:

$\emptyset_{11}(n)$ is the value of the auto correlation function for said one trace of said first group for the noted values $(n)$ of $\tau$;

$\emptyset_{22}(n)$ is a similar value for said corresponding trace of said second group;

$\emptyset_{12}(n)$ and $\emptyset_{21}(n)$ are the values of the respective cross correlation functions of the corresponding traces of the first and second groups for the noted values $(n)$ of $\tau$;

$-1$, $0$, $f_{11}$, $f_{21}$ ... $f_{1n}$, $f_{2n}$ correspond respectively with the relative modification applied to the successive time delayed signals from said one trace of said first group and from said corresponding trace; and $P_{11}$ and $P_{12}$ are uniquely identified by the solution of said matrix equation.

References Cited

Robinson et al.: "Principles of Digital Filtering" Geophysics, vol. XXIX, No. 3 (June 1964), pp. 395–404.

RODNEY D. BENNETT, JR., Primary Examiner

D. C. KAUFMAN, Assistant Examiner